(12) United States Patent
Lin

(10) Patent No.: US 8,025,755 B2
(45) Date of Patent: Sep. 27, 2011

(54) PROCESS FOR PRODUCING GM-SIDING WITH WOOD GRAIN

(76) Inventor: Qi-hong Lin, Nanjing (CN)

( * ) Notice: Subject to any disclaimer, the term of this patent is extended or adjusted under 35 U.S.C. 154(b) by 0 days.

(21) Appl. No.: 12/524,740

(22) PCT Filed: Oct. 30, 2007

(86) PCT No.: PCT/CN2007/003082
§ 371 (c)(1),
(2), (4) Date: Jul. 28, 2009

(87) PCT Pub. No.: WO2008/148261
PCT Pub. Date: Dec. 11, 2008

(65) Prior Publication Data
US 2010/0084085 A1 Apr. 8, 2010

(30) Foreign Application Priority Data

Jun. 8, 2007 (CN) .......................... 2007 1 0023552
Jun. 8, 2007 (CN) .......................... 2007 1 0023553

(51) Int. Cl.
*B29C 65/70* (2006.01)
*B32B 37/02* (2006.01)
*B32B 38/04* (2006.01)
*B32B 38/06* (2006.01)
*B05D 3/00* (2006.01)
*C25D 5/00* (2006.01)

(52) U.S. Cl. ........ 156/270; 156/209; 156/220; 156/246; 156/256; 156/263; 156/307.1; 156/222; 264/131; 264/219; 205/178; 427/292

(58) Field of Classification Search .................. 156/209, 156/220, 222, 246, 256, 263, 270, 307.1; 264/131, 219; 205/178; 427/292
See application file for complete search history.

(56) References Cited

U.S. PATENT DOCUMENTS 3,869,535 A * 3/1975 Coll-Palagos ................ 264/219
7,255,907 B2 * 8/2007 Feigin et al. .................... 428/70

FOREIGN PATENT DOCUMENTS

| CN | 1100372 | 3/1995 |
| CN | 1211502 | 3/1999 |
| CN | 1539788 | 10/2004 |

OTHER PUBLICATIONS

Cao et al., "Use of Modifier in Glass Fiber Reinforced Magnesium Cement Board", *New Building Materials*, 2003, No. 8, pp. 9-12.
Yan, "Technique of Production and Quality Control of Decorative Board Based on $MgCl_2$-MgO Cement", *China Concrete and Cement Products*, Aug. 1995, No. 4, pp. 42-44 and 62.
Yue, "Development of Glass Fiber Reinforced Magnesium Cement Board Imitating Fraxinus Mandshurica Wood", *China Wood Industry*, Sep. 1999, vol. 13, No. 5, pp. 31-33.

* cited by examiner

*Primary Examiner* — Linda L Gray
(74) *Attorney, Agent, or Firm* — Allen, Dyer, Doppelt, Milbrath & Gilchrist, P.A.

(57) ABSTRACT

Disclosed is a process for producing composite board, and the said board is glass fiber reinforced magnesium cement board with wood grain. The process comprises two steps of preparing a mold with wood grain and preparing glass fiber reinforced magnesium cement board using the mold. The first step comprises forming film bearing wood grain, copying the wood grain onto mill rolls, and rolling the formwork with the mill rolls. The second step comprises steps of preparing $MgCl2$ solution, agitating the mixed raw materials to obtain slurry, conveying the molds, scratching the slurry, disposing the raw materials, rolling, separating, shelving, curing, impregnating the board into water to remove free $MgCl2$, cutting, spraying protecting-paint, and so on. The process can produce the board with three-dimensional appeal, wood grain similar to that of log, and beautiful appearance. The board produced by the process has advantages of fire proof, water proof, vermin proof, light weight, compression and bending resistant, high strength, no moss growing, and so on.

10 Claims, No Drawings

PROCESS FOR PRODUCING GM-SIDING WITH WOOD GRAIN

TECHNICAL FIELD

The present invention relates to a process for producing composite boards and, more particularly, to a process for producing wood-grained glass magnesium sidings.

BACKGROUND ART

Exterior walls of modern buildings are mostly decorated with decorative bricks while exterior walls of some villas and wooden buildings are generally decorated with exterior wall siding. There are many types of exterior wall siding, mainly including natural wood board, plastic cladding, fiber-cement board, each of which presents respective disadvantages. The natural wood board is inflammable, is susceptible to insect infestation and rotting. The plastic cladding is inflammable, easily deformed and aged. The fiber-cement board is heavy in weight and is easily fractured and is difficult to install.

Since 1867, when Sorel, a French, invented magnesium oxychloride cement, to now, more than one hundred and twenty years has passed. The products made from magnesium oxychloride cement have excellent fire-resistance, low thermal conductivity, and high compressive strength and flexural strength. Glass magnesium siding (GM-Siding) is made from magnesium cement, which is a magnesia gel material. The main structure thereof is Magnesium oxide (MgO)—Magnesium Chloride ($MgCl_2$) and water ($H_2O$) ternary system incorporated with reinforced materials. Glass magnesium siding can be sawed, nailed and shaved and is light in weight and is insect-proof. Moreover, since it makes the full use of the waste of woods (for example sawdust, and wood shavings and the like), glass magnesium siding is a new type of material which can replace wood, and is also a satisfying means to save wood. In the prior art, the process for producing wood-grained glass magnesium siding is as yet immature and thus is not practical for producing glass magnesium siding of various wood grain patterns.

Contents of Invention

The object of the present invention is to provide a process for producing wood-grained glass magnesium siding, thereby qualified wood-grained glass magnesium siding can be manufactured.

The object of the present invention is carried out by the following technical scheme:

A process for producing wood-grained glass magnesium siding, including two procedures of manufacturing wood-grained templates and manufacturing wood-grained glass magnesium boards, wherein the procedure of manufacturing wood-grained templates includes:

(1) capturing wood grain patterns on the surface of a natural wood panel with a digital camera or generating various wood grain patterns with a computer, and manufacturing a film of wood grain patterns which has the same dimension as the glass magnesium siding to be produced according to the wood grain patterns;

(2) manufacturing a roller, with the wood grain patterns in the film copied onto the roller using photographic projection method, and eroding the roller with a corrosive electrolyte to remove the unwanted portion and remain the wood grain patterns;

(3) treating the roller with hard chromium plating such that the hardness of the roller surface reaches an acceptable hardness to roll the templates;

(4) installing the roller to a device for rolling the templates, so as to produce templates of various materials according to the materials required;

(5) checking the produced templates to determine whether the wood grain patterns conform to those desired for the glass magnesium siding and to select qualified templates for use in the future;

and wherein the procedure of manufacturing wood-grained glass magnesium siding includes:

(1) preparing magnesium chloride ($MgCl_2$) solution by pouring Magnesium Chloride in solid form into a water pool, adding water into the pool to dissolve Magnesium Chloride thoroughly and adjusting the concentration of the resulting solution to a desired concentration, and reducing the temperature of $MgCl_2$ solution to less than 30° C.;

(2) mixing and agitating to prepare cement paste and cement material respectively, wherein cement paste is prepared by agitating the prepared $MgCl_2$ solution and MgO in a blunger such that the resulting mixtures are mixed thoroughly, and wherein cement material is prepared by agitating wood chips or pearlite powder, MgO, prepared $MgCl_2$ solution in a mixer such that the various ingredients are mixed thoroughly;

(3) feeding the templates, wherein the wood-grained templates on which a release agent has been sprayed are fed into a flow production line, on which each of the wood-grained templates contacts with the adjacent one end to end;

(4) scraping the cement paste, wherein a first layer of cement paste is scraped on the wood-grained templates, followed by overlaying a layer of glass fiber fabric, and then scraping a second layer of cement paste on the layer of glass fiber fabric;

(5) supplying the cement material, wherein a layer of cement material is overlaid on the second layer of cement paste scraped in step (4), and then one or more layers of glass fiber fabric are overlaid on the layer of cement material, and finally one or more layers of non-woven fabric are overlaid on the layer of glass fiber fabric;

(6) rolling, wherein the templates which have been supplied with the cement material are rolled into shape via the roller;

(7) disconnecting, wherein the shaped boards are disconnected along the joint between two adjacent wood-grained templates;

(8) mounting on brackets, wherein the disconnected boards are mounted on brackets and are pruned by scraping off fine wrinkles on the board surface and cement paste and cement material dropped from two ends by a scraper;

(9) curing, wherein the pruned boards are transported into a curing area to be solidified into shape and demoulded;

(10) soaking and drying to drive brine off, wherein the cured boards are placed into a brine-removing pool and clear water is added into the pool to soak the boards for 8 to 15 hours, followed by swabbing-off the waste water; after clear water is added again for soaking for 8 to 15 hours, the boards are lifted to be placed in a shining ground for drying;

(11) cutting, wherein the dried boards are cut according to desired dimensions;

(12) spraying with protective priming paint, wherein after the cut boards are cleaned to remove dust, protective priming paint is sprayed on the bottom of boards, and after staying at an environmental temperature between 10° C. and 35° C. for 2 to 6 hours, the finished products can be packaged after final examination.

The object of the present invention can be further carried out by incorporating the following technical measures:

In step (1) of the procedure of manufacturing wood-grained templates in the process for producing wood-grained glass magnesium siding, the following steps are performed when the wood grain patterns on the surface of natural wood panel are captured with a digital camera:

I) a natural wood panel which has similar patterns to those desired for the glass magnesium siding to be produced is selected; the selected natural wood panel is processed to have the same dimensions as the glass magnesium siding to be produced;

II) the upper layer of cork on the surface of the natural wood panel is removed so that the wood grain patterns on the surface of the natural wood panel appear; the depth of the wood grain patterns is processed suitably according to the effect desired for the glass magnesium siding;

III) the wood grain patterns on the surface of the natural wood panel are captured with a digital camera.

In the process for producing wood-grained glass magnesium siding, the concentration of $MgCl_2$ solution in step (1) of the procedure of manufacturing wood-grained glass magnesium boards ranges from 20 Be to 30 Be.

In step (2) of the procedure of manufacturing wood-grained glass magnesium boards in the process for producing wood-grained glass magnesium siding, when preparing cement paste, $MgCl_2$ solution is firstly poured into a blunger, and then MgO is added, wherein the ratio of $MgCl_2$ solution to MgO is 1~2 Kg of MgO in $MgCl_2$ solution per liter; when preparing cement material, wood chips or pearlite powder is firstly poured into a mixer, after the mixer runs 3 to 5 revolutions, MgO is added; then the mixer starts running and $MgCl_2$ solution is simultaneously added; 1 to 3 minutes later, additional wood chips or pearlite powder is added under agitation so that the ingredients are mixed thoroughly.

In step (2) of the procedure of manufacturing wood-grained glass magnesium boards in the said process for producing wood-grained glass magnesium siding, when preparing cement material, the ratio between wood chips or pearlite powder added in the first time, MgO, $MgCl_2$ solution, wood chips or pearlite powder added in the second time is as follows: 1 Kg of wood chips or pearlite powder added in the first time, 4~9 Kg of MgO, 8~18 L of $MgCl_2$ solution, 1~3 Kg of wood chips or pearlite powder added in the second time.

In step (4) of the procedure of manufacturing wood-grained glass magnesium boards in the process for producing wood-grained glass magnesium siding, the thickness of the first layer of cement paste is from 0.2 to 0.5 mm, and the thickness of the second layer of cement is from 0.1 to 0.3 mm.

In step (5) of the procedure of manufacturing wood-grained glass magnesium boards in the process for producing wood-grained glass magnesium siding, a first layer of cement material is overlaid on the second layer of cement paste scraped in step (4), and then a layer of glass fiber fabric is overlaid on the first layer of cement material, and then a second layer of cement material is overlaid on the layer of glass fiber fabric, and then another layer of glass fiber fabric is overlaid on the second layer of cement material, finally, one or more layers of non-woven fabric are overlaid on the layer of glass fiber fabric.

In step (5) of the procedure of manufacturing wood-grained glass magnesium boards in the said process for producing wood-grained glass magnesium siding, the thickness of the layer of cement material is from 4 to 20 mm.

In step (9) of the procedure of manufacturing wood-grained glass magnesium boards in the process for producing wood-grained glass magnesium siding, when curing the boards, a primary curing is performed in a primary curing area at the environmental temperature of 20° C.~30° C. for 18 to 24 hours; when the boards have a curing ratio of more than 90%, demoulding is performed; subsequently, a secondary curing is performed in a secondary curing area at the temperature of 10° C.~35° C. for 10 to 28 days.

In step (10) of the procedure of manufacturing wood-grained glass magnesium boards in the process for producing wood-grained glass magnesium siding, the temperature for drying is between 20° C. and 40° C. for 7 to 9 days under ventilation and moisture removing.

The advantages of the present invention are as follows: with the present invention, qualified wood-grained templates for glass magnesium exterior siding can be manufactured, further more, glass magnesium siding having wood grain patterns and three dimensional effect can be manufactured using the wood-grained templates, wherein the wood grain patterns of the glass magnesium siding are similar to the patterns of the natural wood and have a good looking. The process for producing wood-grained glass magnesium siding according to the present invention is simple, and the wood-grained glass magnesium siding manufactured is fireproof, waterproof, insect-proof, and has light weight, high compressive strength and flexural strength with no moss growing. Since the wood-grained glass magnesium siding is prepared by hydration reaction between inorganic substances, such as $MgCl_2$, MgO, and water, the constitution of the raw materials determines the properties such as waterproof and insect-proof. Its fire protection property meets the standards of Grade A incombustibility. Since soaking in water and driving brine off are performed during production process, the wood-grained glass magnesium siding according to the present invention has a property of waterproof. The test result shows that the density of the wood-grained glass magnesium siding according to the present invention is 0.9~1.1 t/m$^3$ (while the density of plasterboard and fiber-cement board is about 1.3~1.5 t/m$^3$), having more than 53 Mpa of anti-compressive strength and more than 80 Mpa of flexural strength. No moss is growing when used in humid environment for 3 years. Thanks to no formaldehyde and benzene in it, the wood-grained glass magnesium siding according to the present invention is environment-friendly.

BEST MODE FOR CARRYING OUT THE INVENTION

The present invention relates to a process for producing wood-grained glass magnesium siding, including two procedures of manufacturing wood-grained templates and manufacturing wood-grained glass magnesium boards.

Wherein the procedure of manufacturing wood-grained templates includes following steps:

Manufacture a film of wood grain patterns which has the same dimension as the wood-grained glass magnesium siding to be produced. When manufacturing the film of wood grain patterns, a natural wood panel which has similar patterns to the patterns desired for the glass magnesium siding to be produced is selected. The selected natural wood panel is processed to have the same dimensions as the glass magnesium siding to be produced; The upper layer of cork on the surface of the natural wood panel is removed so that the wood grain patterns on the surface of the natural wood panel appear. The depth of the wood grain patterns is processed suitably according to the effect desired for the glass magnesium siding. The wood grain patterns on the surface of natural wood panel are captured with a digital camera. According to the patterns, a film of the wood grain patterns which has the same dimension as the glass magnesium siding to be produced is manufactured. Alternatively, the wood grain patterns can be directly generated with a computer. Subsequently, according to the patterns, a film of the wood grain patterns which has the same dimension as the glass magnesium siding to be produced is manufactured.

Manufacture a roller, with the wood grain patterns in the film copied onto the roller using photographic projection method, and eroding the roller with a corrosive electrolyte to remove the unwanted portion and remain the wood grain patterns. The roller is treated with hard chromium plating such that the hardness of the surface of the roll reaches an acceptable hardness to roll the templates.

Install the roller onto a device for rolling the templates, so as to produce templates of various materials according to the materials required, checking the rolled templates to determine whether the patterns of wood grain conform to those desired for the glass magnesium siding and to select the qualified templates for use in the future.

And wherein the procedure of manufacturing wood-grained glass magnesium board includes following steps:

Preparing main raw materials: includes preparation of Magnesium Chloride ($MgCl_2$) solution, determination of the activity and the purity of MgO, and determination of the humidity of wood chips or pearlite powder.

Magnesium Chloride ($MgCl_2$) is one of the two main raw materials for the glass magnesium siding. The quality thereof should satisfy two aspects: one is the effective content of $MgCl_2$, wherein the content of $MgCl_2$ is not less than 43%, and the content of calcium ion is not more than 0.7%; the other is that the content of alkali metal chlorides (calculated as $Cl^-$) is not more than 1.2%, because the contents of $Ca^{2+}$ and $Cl^-$ will directly affect the stability and universal frost of the product.

When preparing Magnesium Chloride solution, Magnesium Chloride (solid $MgCl_2$) is first poured into a water pool and water is added into the pool to dissolve Magnesium Chloride. The amount of added water depends on the desired concentration of brine. The concentration of brine depends on the activity of MgO, the humidity of wood chips or pearlite powder, the air humidity, and the ambient temperature. The higher the activity of MgO and the temperature and the less the relative humidity and the percentage of moisture of wood chips or pearlite powder, the lower the concentration of brine. Otherwise, the higher the concentration of brine. The concentration of brine ranges from 20 Be~30 Be. The concentration of brine should be adjusted according to the change of ambient temperature, air humidity, the activity of MgO. The brine solution should be prepared on the same day as Magnesium Chloride is poured into the water pool such that Magnesium Chloride dissolves thoroughly and arrives to the desired concentration. The temperature of the prepared brine is very high, and it should not be used until the temperature thereof decreases to less than 30° C. Accordingly, the preparation of brine solution should be performed 15 hours prior to use of the brine solution.

Preparing the assistant raw materials: which includes installing a drum for glass fiber fabric and a drum for nonwoven fabric into the flow production line.

Mixing the main raw materials by agitating: wherein the main raw materials are mixed by agitating according to the predetermined ratio and steps. The time for agitating depends on the air humidity and the ambient temperature during production. The higher the humidity and the lower the temperature, the longer the time. For example, in the case of 90% of the relative humidity at 15° C. of temperature, the time for agitating should be 5 minutes, while in the case of 40% of the relative humidity at 30° C. of temperature, the time for agitating should be 3 minutes. The main raw materials should be mixed thoroughly to form cement paste and cement material which meet the demands for production. The blunger and the mixer should be checked prior to production to determine whether they run smoothly. Agitation includes preparation of cement paste and preparation of cement material, which should be performed simultaneously.

Preparing cement paste: wherein the prepared brine is poured into a blunger, and then MgO is added. Immediately the lid of the blunger is covered to agitate the resulting mixture for 1 to 2 minutes. And then, the blunger stops running. The ratio of Magnesium Chloride solution to MgO is 1-2 kg of MgO in 1 L of Magnesium Chloride solution. Before the cement paste is ready, a small part of brine present in the soft tube is poured into a spare bucket to ensure that the stored cement paste does not contain injected brine. Then, the cement paste is ready for use. MgO is also one of the two main raw materials for the glass magnesium siding. Light-burned magnesia is used as a raw material, in which the content of MgO is 80%-85%, and the content of active MgO is no less than 60+−2%, and CaO is less than 1.5%, loss on ignition is 5% to 9%, fineness is no less than 170 mesh.

Preparing the cement material: wherein the wood chips or the pearlite powder is poured into a mixer. After the mixer runs 3 to 5 revolutions, MgO is poured into the mixer. The mixer starts running. Simultaneously the prepared brine is added. 2 minutes later, additional wood chips or pearlite powder is added. After totally agitating for 7 to 8 minutes, the cement material is ready for use. The amount of brine is adjusted lightly according to the contents of moisture in the wood chips or pearlite powder. The wood chips or pearlite powder should have less than 1% of mud content, 20 to 60 mesh of fineness, and less than 25% of moisture content. All the fillers should not be decayed and spoiled.

Operating the flow production line: wherein machines begin with test run before production by wetting belt and hopper with water to examine whether the machines run smoothly, and the machines are shutdown when determining no problem. Examine and adjust the rollers to determine whether they run properly and the machines are shutdown when determining no problem. Examine and adjust the space between the rollers such that the space between the first rollers is 10.4 mm and the space between the second rollers is 10.6 mm. Simultaneously, glass fiber fabric and nonwoven fabric are installed on brackets and fed into the rollers. Tension of glass fiber fabric and nonwoven fabric is adjusted.

Feeding the templates: wherein the wood-grained templates on which a release agent has been sprayed are fed into the flow production line. Dusts and rubbish on the wood-grained templates are cleaned, and then a release agent is sprayed evenly on every point and surface on the templates. Spraying too much the release agent or leakage of the release agent is not allowed. Wood-grained templates on which a release agent has been sprayed are fed into a board making machine. Each board is required to contact with the adjacent one end to end and can not have space or overlapping therebetween.

Scraping cement paste: wherein a first layer of cement paste is scraped on the wood-grained templates and then a layer of glass fiber fabric is overlaid on the first layer of cement paste. A second layer of cement paste is scraped on the layer of glass fiber fabric. When scraping cement paste, in the case of no blurred pattern present on the surface of wood-grained templates, the thinner the cement paste, the better. Uniform thickness is required. When the thickness of cement paste is not uniform, the boards become easily deformed and easily fractured. The first layer of cement paste is 0.2 to 0.5 mm in thickness and the second layer of cement is 0.1 to 0.3 mm in thickness.

Mixing rolling the raw materials: wherein the cement paste and cement material of main raw materials are mixed with assistant raw materials on the wood-grained templates and rolled into shape by the two rollers in the flow production line.

Supplying the cement material: wherein a layer of cement material is overlaid on the second layer of cement paste. The cement material can not be provided too much or too little one time. Too much cement material will cause the boards to shrink. Too much shrinkage will make the boards short such that the product is no use; While, too little cement material will make the produced boards loose such that the cement material is not sufficient and makes the products with no even thickness. The thickness of the cement material should be 6 to 12 mm. Subsequently, a layer of glass fiber fabric is overlaid on the layer of cement material, and then a layer of nonwoven fabric is overlaid on the layer of glass fiber fabric. The two layers of glass fiber fabric and the layer of nonwoven fabric should be smooth and have no fold on surface.

Disconnecting: wherein conjoined boards produced by the machines are disconnected with a craft knife along the joint between the two wood-grained templates. When the boards on the machines are transported to the disconnecting area, disconnecting should be done in time. The surfaces of the disconnected boards are primarily pruned, especially at the two ends, where cement material should be filled in time in finding defects of material shortage.

Installing on brackets after exiting from the line: wherein before the boards arrive at the end of the brackets, the bracket should be installed firmly and the brackets which support the boards should not be tilted.

Primary curing: wherein once they are mounted on brackets, the products are transported immediately into a primary curing area to cure. The environment temperature in the primary curing area should be kept between 20° C. and 30° C. After entering the primary curing area, the boards should be pruned prior to curing by scraping fine wrinkles on the surface of the boards and cement paste and cement material dropped from the two ends off with a scraper. After curing for 18 to 24 hours and having a curing ratio of more than 90%, demoulding is performed.

Secondary curing: wherein the products which have been primarily cured should be transported into a secondary curing area to cure in stack. The height of stack should be not more than 1.2 meter. The environment temperature in the secondary curing area should be kept between 10° C. and 35° C. The time for curing should be 10~28 days.

Soaking to drive brine off: wherein the products which have been secondarily cured are put into a brine-removing pool and clear water is added into the pool to soak the boards for 8 to 15 hours, followed by swabbing-off the waste water. Again clear water is poured in for soaking the boards for 8 to 15 hours, and then the boards are lifted to be placed in a shining ground for drying. If soaking-free technology is applied, the procedure of soaking and drying to remove brine may not be necessary.

Drying and shining: wherein products are placed in the drying ground. The environment temperature in the drying ground should be kept between 20° C. and 40° C. for 7 to 9 days under ventilation and moisture removing.

Cutting: wherein the dried boards are fed into a cutter to be cut according to the desired dimensions.

Spraying with protective priming paint: wherein after the cut boards are cleaned to remove dust, protective priming paint (white) is sprayed on the bottom of boards. After staying at the environmental temperature between 10° C. and 35° C. for 2 and 6 hours, the finished products can be packaged after final examination.

EXAMPLE 1

The example is a process for producing wood-grained glass magnesium siding and it is performed according to the following steps:

(1) A natural wood panel which has similar patterns to the patterns desired for the glass magnesium siding to be produced is selected. The selected natural wood panel is processed to have the same dimensions as the glass magnesium siding to be produced.

(2) The upper layer of cork on the surface of the natural wood panel is removed. The height of the removed layer of cork is between 0.1 and 0.8 mm so that the wood grain patterns on the surface of the natural wood panel appear. The depth of the wood grain pattern is processed suitably according to the effect desired for the glass magnesium siding.

(3) The wood grain patterns on the surface of natural wood panel are captured with a digital camera. According to the patterns, a film of the wood grain patterns which has the same dimension as the glass magnesium siding to be produced is manufactured.

(4) A roller is manufactured. The wood grain patterns in the film are copied onto the roller with photographic projection method. The roller is eroded with a corrosive electrolyte to remove the unwanted portion and remain the wood grain patterns.

(5) The roller is treated with hard chromium plating such that the hardness of the surface of the roller reaches an acceptable hardness to roll the templates. The surface hardness of the roller is HRC58.

(6) The roller is mounted to a device for rolling the templates. Templates of various materials are produced according to the materials required by the templates.

(7) Check the rolled templates to determine whether the wood grain patterns conform to the wood grain patterns desired for the glass magnesium siding and to select the qualified templates for use in the future.

(8) Magnesium chloride (solid $MgCl_2$) is poured into a water pool and water is added into the pool. The activity of MgO is 80%, the humidity of wood chips or pearlite powder is 5%, the air humidity is 70%, and the ambient temperature is 25° C. The concentration of the brine solution is 30 Be. Water is gradually added until the concentration of the brine solution is 30 Be and water adding is stopped immediately.

(9) A drum for glass fiber fabric and a drum for nonwoven fabric are installed in the flow production line.

(10) Cement paste is prepared: 26 liter of brine with a concentration of 30 Be is poured into a blunger, and then 26 kg of MgO is added. And then, the lid of the blunger is covered to agitate for 1 to 2 minutes. Subsequently, the blunger stops running. Before the cement paste is ready, a small part of brine present in the soft tube is poured into a spare bucket to ensure that the prepared cement paste does not contain injected brine. Then, the cement paste is ready for use.

The cement material is prepared: The order of agitating the main raw materials includes putting 15 kg of the wood chips or pearlite powder into the mixer. After the mixer runs 3 revolutions, 60 kg of MgO is poured into the mixer. The mixer begins running and 120 liter of brine is added simultaneously. 1 minute later, additional 15 kg of wood chips or pearlite powder is added. After totally agitating for 7 to 8 minutes, the cement material is ready for use.

(11) Machines begins test run before production by wetting belt and hopper with water to examine whether the machines runs smoothly and closing the machines when determining there is no problem, examining and adjusting the rollers whether they runs properly and closing the machines when determining that there is no problem, examining and adjusting the space between the rollers such that the space between the first rollers is 8.6 mm and the space between the second rollers are 8.8 mm. Simultaneously, glass fiber fabric and nonwoven fabric are installed on brackets and fed into the rollers.

(12) Wood-grained templates on which a release agent has been sprayed are fed into the flow production line. Each board is required to contact with the adjacent one end to end and can not have space or overlapping therebetween.

(13) A first layer of cement paste having 0.2 mm in thickness is scraped on the wood-grained templates and then a layer of glass fiber fabric is overlaid on. A second layer of cement paste having 0.1 mm in thickness is scraped on the layer of glass fiber fabric.

(14) A layer of cement material having 6 mm in thickness is overlaid on the second layer of cement paste. A layer of glass fiber fabric is overlaid on the layer of cement material, and then a layer of nonwoven fabric is overlaid on the layer of glass fiber fabric.

(15) When the boards on the machines are transported to the disconnecting area, conjoined boards produced by the machines are disconnected with a craft knife along the joint between the two wood-grained templates.

(16) The disconnected boards are mounted onto the brackets and are pruned. Fine wrinkles on the surface of the boards and cement and cement material dropped from the two ends are scraped off with a scraper.

(17) The boards on the brackets are transported into a primary curing area, wherein the environment temperature in the primary curing area should be kept at 20° C. After curing for 24 hours and having a curing ratio of more than 90%, demoluding is performed.

(18) The products which have been finished primary curing should be transported into a secondary curing area to cure in stack, wherein the environment temperature in the second curing area should be kept at 10° C. and the time for curing is 28 days.

(19) The products which have been finished the secondary curing are placed in a brine-removing pool and clear water is added into the pool to soak the boards for 8 hours, followed by swabbing-off the waste water; Clear water is added again to soak the boards for 8 hours. And then the boards are lifted to place in a shining ground at the temperature of 20° C. for 9 days under ventilation and moisture removing.

(20) The dried boards are fed into a cutter to be cut according to the desired dimensions.

(21) After the cut boards are cleaned to remove dust, protective priming paint(white) is sprayed on the bottom of boards. After staying for 6 hours at the environmental temperature of 10° C., the final products can be packaged after final examination.

EXAMPLE 2

The example is a process for producing wood-grained glass magnesium siding and it is performed according to the following steps:

(1) Various wood grain patterns are generated with a computer. A film of the wood grain patterns which has the same dimension as the wood-grained glass magnesium siding to be produced is manufactured according to the said wood grain patterns.

(2) A roller is manufactured. The wood grain patterns in the film are copied onto the roller with projection light-sensitive process. The roller is eroded with a corrosive electrolyte to remove the unwanted portion and remain the wood grain patterns.

(3) The roller is treated with hard chromium plating such that the hardness of the surface of the roller reaches an acceptable hardness to roll the templates. The surface hardness of the roller is HRC58.

(4) The roller is mounted to a device for rolling the templates. Templates of various materials are produced depending on the materials required by the templates.

(5) The rolled templates are examined to determine whether the wood grain patterns conform to the wood grain patterns desired for the glass magnesium siding and to select the qualified templates for use in the future.

(6) Magnesium Chloride (solid $MgCl_2$) is poured into a water pool and water is added into the pool to dissolve Magnesium Chloride. The activity of MgO is 85%, the humidity of wood chips or pearlite is 25%, the air humidity is 60%, and the ambient temperature is 30° C. The concentration of brine is 22 Be. Water is gradually added until the concentration of the brine solution is 22 Be, and water adding is stopped immediately.

(7) A drum for glass fiber fabric and a drum for nonwoven fabric are mounted in the flow production line.

(8) Cement paste is prepared: 26 liter of brine with a concentration of 22 Be is poured into a blunger, and then 40 kg of MgO is added. And then, the lid of blunger is closed and begins agitating for 1 to 2 minutes. Subsequently, the blunger stops running. Before the cement paste is ready, a small part of brine present in the soft tube is poured into a spare bucket to ensure that the prepared cement paste does not contain injected brine. Then, the cement paste is ready for use.

The cement material is prepared: The order of agitating the main materials includes putting 15 kg of the wood chips or pearlite powder into the mixer. After the mixer runs 4 revolutions, 80 kg of MgO is poured into the mixer. The mixer begins running and 140 liter of brine is added simultaneously. 2 minutes later, additional 30 kg of wood chips or pearlite powder is added. After totally agitating for 7 to 8 minutes, the cement material is ready for use.

(9) Machines begin test run before production by wetting belt and hopper with water to examine whether the machines runs smoothly and closing the machines when determining there is no problem, examining and adjusting the rollers whether they runs properly and closing the machines when determining that there is no problem, examining and adjusting the space between the rollers such that the space between the first rollers is 10.4 mm and the space between the second rollers is 10.6 mm. Simultaneously, glass fiber fabric and nonwoven fabric are installed on brackets and fed into the rollers.

(10) Wood-grained templates on which a release agent has been sprayed are fed into the flow production line. Each board is required to contact end to end and can not have space and overlapping.

(11) A first layer of cement paste having 0.3 mm in thickness is scraped on the wood-grained templates and then a layer of glass fiber fabric is overlaid. A second layer of slurry having 0.2 mm in thickness is scraped on the layer of glass fiber fabric.

(12) A layer of cement material having 7.5 mm in thickness is overlaid on the second layer of cement paste, and a layer of glass fiber fabric is overlaid on the layer of cement material. And then, a layer of nonwoven fabric is overlaid on the layer of glass fiber fabric.

(13) When the boards on the machines are transported to the disconnecting area, conjoined boards produced by the machines are disconnected with a craft knife along the joint between the two wood-grained templates.

(14) The disconnected boards are mounted onto the brackets. Fine wrinkles on the surface of the boards and cement paste and cement material dropped from the two ends are scraped off with a scraper.

(15) The boards on the brackets are transported into a primary curing area, wherein the environment temperature in the primary curing area should be kept at 25° C. After curing for 20 hours and having a curing ratio of more than 90%, demoulding is performed.

(16) The products which have been finished primary curing should be transported into a secondary curing area to cure in stack, wherein the environment temperature in the primary curing area should be kept at 20° C. and the time for curing is 20 days.

(17) The products which have been finished the secondary curing are placed in a brine-removing pool and clear water is added into the pool to soak the boards for 12 hours, followed by swabbing-off the waste water; Clear water is added again to soak the boards for 12 hours. And then the boards are lifted to place in a shining ground at the temperature of 30° C. for 8 days under ventilation and moisture removing.

(18) The dried boards are fed into a cutter to be cut according to the desired dimensions.

(19) After the cut boards are cleaned to remove dust, protective priming paint (white) is sprayed on the bottom of boards. After staying for 6 hours at the environmental temperature of 20° C., the final products can be packaged after final examination.

EXAMPLE 3

The example is a process for producing wood-grained glass magnesium siding and it is performed according to the following steps:

(1) A natural wood panel which has similar patterns to the patterns desired for the glass magnesium siding to be produced is selected. The selected natural wood panel is processed to have the same dimensions as the glass magnesium siding to be produced.

(2) The upper layer of cork on the surface of the natural wood panel is removed. The height of the removed layer of cork is between 0.1 and 0.8 mm such that the wood grain patterns on the surface of the natural wood panel appears. The depth of the wood grain patterns is processed suitably according to the result desired for the glass magnesium siding.

(3) The wood grain patterns on the surface of natural wood panel are captured with a digital camera. According to the patterns, a film of the wood grain patterns which has the same dimension as the glass magnesium siding to be produced is manufactured.

(4) A roller is manufactured. The wood grain patterns in the film are copied onto the roller with projection light-sensitive process. The roller is eroded with a corrosive electrolyte to remove the unwanted portion and remain the wood grain patterns.

(5) The roller is treated with hard chromium plating such that the hardness of the surface of the roller reaches an acceptable hardness to roll the templates. The surface hardness of the roller is HRC58.

(6) The roller is mounted to a device for rolling the templates. Templates of various materials are produced depending on the materials required by the templates.

(7) The rolled templates are examined to determine whether the wood grain patterns conform to the wood grain patterns desired for the glass magnesium siding and to select the qualified templates for use in the future.

(8) Magnesium Chloride(solid $MgCl_2$) is poured into a water pool and water is added into the pool to dissolve Magnesium Chloride. The activity of MgO is 90%, the humidity of wood chips or pearlite powder is 20%, the air humidity is 50%, and the ambient temperature is 32° C. The concentration of the brine solution is 20 Be. Water is gradually added until the concentration of brine is 20 Be and water adding is stopped immediately.

(9) A drum for glass fiber fabric and a drum for nonwoven fabric are mounted in the flow production line.

(10) Cement paste is prepared: 26 liter of brine with a concentration of 22 Be is poured into a blunger, and then 52 kg of MgO is added. And then, the lid of the blunger is covered to agitate for 1 to 2 minutes. Subsequently, the blunger stops running. Before the cement paste is ready, a small part of brine present in the soft tube is poured into a spare bucket to ensure that the prepared cement paste does not contain injected brine. Then, the cement is ready for use.

The cement material is prepared: The order of agitating the main materials includes putting 15 kg of the wood chips or pearlite powder into the mixer. After the mixer runs 5 revolutions, 135 kg of MgO is poured into the mixer. The mixer begins running and 270 liter of brine is added simultaneously. 3 minutes later, additional 45 kg of wood chips or pearlite powder is added. After totally agitating for 7 to 8 minutes, the cement material is ready for use.

(11) Machines begins test run before production by wetting belt and hopper with water to examine whether the machines run smoothly and closing the machines when determining there is no problem, examining and adjusting the rollers whether they runs properly and closing the machines when determining that there is no problem, examining and adjusting the space between the rollers such that the space between the first rollers is 12.2 mm and the space between the second rollers are 12.4 mm. Simultaneously, glass fiber fabric and nonwoven fabric are installed on brackets and fed into the rollers.

(12) Wood-grained templates on which a release agent has been sprayed are fed into the flow production line. Each board is required to contact end to end and can not have space and overlapping.

(13) A first layer of cement paste having 0.5 mm in thickness is scraped on the wood-grained templates and then a layer of glass fiber fabric is overlaid. A second layer of cement paste having 0.3 mm in thickness is scraped on the layer of glass fiber fabric.

(14) A layer of cement material having 12 mm in thickness is overlaid on the second layer of cement paste, and a layer of glass fiber fabric is overlaid on the layer of cement material. And then, a layer of nonwoven fabric is overlaid on the layer of glass fiber fabric.

(15) When the boards on the machines are transported to the disconnecting area, conjoined boards produced by the machines are disconnected with a craft knife along the joint between the two wood-grained templates.

(16) The cutted boards are mounted onto the brackets and are pruned. Fine wrinkles on the surface of the boards and cement paste and cement material dropped from the two ends are scraped off with a scraper.

(17) The boards on the carriages are transported into a primary curing area, wherein the environment temperature in the primary curing area should be kept at 30° C. After curing for 18 hours and having a curing ratio of more than 90%, demoulding is performed.

(18) The products which have been finished primary curing should be transported into a secondary curing area to cure in stack, wherein the environment temperature in the primary curing area should be kept at 35° C. and the time for curing is 10 days.

(19) The products which have been finished the secondary curing are put in a brine-removing pool and add clear water into the pool to soak the boards for 15 hours, followed by swabbing-off the waste water; Clear water is added again to soak the boards for 15 hours. And then the boards are lifted to place in a shining ground at the temperature of 40° C. for 7 days under ventilation and moisture removing.

(20) The dried boards are fed into a cutter to be cut according to the desired dimensions.

(21) After the cut boards are cleaned to remove dust, protective priming paint (white) is sprayed on the bottom of boards. After staying for 6 hours at the environmental temperature of 35° C., the final products can be packaged after final examination.

The present invention can be further embodied by other alternative examples, all the technical solutions which use equivalent replacements or changes fall within the protection scope claimed by the present invention.

The invention claimed is:

1. A process for producing wood-grained glass magnesium siding, including two procedures of manufacturing wood-grained templates and manufacturing wood-grained glass magnesium boards, wherein the procedure of manufacturing wood-grained templates includes:
   (1) capturing wood grain patterns on the surface of a natural wood panel with a digital camera or generating various wood grain patterns with a computer, and manufacturing a film of wood grain patterns which has the same dimension as the glass magnesium siding to be produced according to the wood grain patterns;
   (2) manufacturing a roller, with the wood grain patterns in the film copied onto the roller using photographic projection method, and eroding the roller with a corrosive electrolyte to remove the unwanted portion and remain the wood grain patterns;
   (3) treating the roller with hard chromium plating such that the hardness of the roller surface reaches an acceptable hardness to roll the templates;
   (4) installing the roller to a device for rolling the templates, so as to produce templates of various materials according to the materials required;
   (5) checking the produced templates to determine whether the wood grain patterns conform to those desired for the glass magnesium siding and to select qualified templates for use in the future;
   and wherein the procedure of manufacturing wood-grained glass magnesium siding includes:
   (1) preparing $MgCl_2$ solution by pouring Magnesium Chloride in solid form into a water pool, adding water into the pool to dissolve Magnesium Chloride thoroughly and adjusting the concentration of the resulting solution to a desired concentration, and reducing the temperature of $MgCl_2$ solution to less than 30° C.;
   (2) mixing and agitating to prepare cement paste and cement material respectively, wherein cement paste is prepared by agitating the prepared $MgCl_2$ solution and MgO in a blunger such that resulting mixtures are mixed thoroughly, and wherein cement material is prepared by agitating wood chips or pearlite powder, MgO, prepared $MgCl_2$ solution in a mixer such that the various ingredients are mixed thoroughly;
   (3) feeding the templates, wherein the wood-grained templates on which a release agent has been sprayed are fed into a flow production line, on which each of the wood-grained templates contacts with the adjacent one end to end;
   (4) scraping the cement paste, wherein a first layer of cement paste is scraped on the wood-grained templates, followed by overlaying a layer of glass fiber fabric, and then scraping a second layer of cement paste on the layer of glass fiber fabric;
   (5) supplying the cement material, wherein a layer of cement material is overlaid on the second layer of cement paste scraped in step (4), and then one or more layers of glass fiber fabric are overlaid on the layer of cement material, and finally one or more layers of nonwoven fabric are overlaid on the layer of glass fiber fabric;
   (6) rolling, wherein the templates which have been supplied with the cement material are rolled into shape via the roller;
   (7) disconnecting, wherein the shaped boards are disconnected along the joint between two adjacent wood-grained templates;
   (8) mounting on brackets, wherein the disconnected boards are mounted on brackets and are pruned by scraping off fine wrinkles on the board surface and cement paste and cement material dropped from two ends by a scraper;
   (9) curing, wherein the pruned boards are transported into a curing area to be solidified into shape and demoulded;
   (10) soaking and drying to drive brine off, wherein the cured boards are placed into a brine-removing pool and clear water is added into the pool to soak the boards for 8 to 15 hours, followed by swabbing-off the waste water; after clear water is added again for soaking for 8 to 15 hours, the boards are lifted to be placed in a shining ground for drying;
   (11) cutting, wherein the dried boards are cut according to desired dimensions;
   (12) spraying with protective priming paint, wherein after the cut boards are cleaned to remove dust, protective priming paint is sprayed on the bottom of boards, and after staying at an environmental temperature between 10° C. and 35° C. for 2 to 6 hours, the finished products can be packaged after final examination.

2. The process for producing wood-grained glass magnesium siding according to claim 1, wherein in step (1) of the procedure of manufacturing wood-grained templates in the process for producing wood-grained glass magnesium siding, the following steps are performed when the wood grain patterns on the surface of natural wood panel are captured with a digital camera:
   I) a natural wood panel which has similar patterns to those desired for the glass magnesium siding to be produced is selected; the selected natural wood panel is processed to have the same dimensions as the glass magnesium siding to be produced;
   II) an upper layer of cork on the surface of the natural wood panel is removed so that the wood grain patterns on the surface of the natural wood panel appear; the depth of the wood grain patterns is processed suitably according to the effect desired for the glass magnesium siding;
   III) the wood grain patterns on the surface of the natural wood panel are captured with a digital camera.

3. The process for producing wood-grained glass magnesium siding according to claim 1, wherein the concentration of $MgCl_2$ solution in step (1) of the procedure of manufacturing wood-grained glass magnesium boards ranges from 20 Be to 30 Be.

4. The process for producing wood-grained glass magnesium siding according to claim 1, wherein in step (2) of the procedure of manufacturing wood-grained glass magnesium boards, when preparing cement paste, $MgCl_2$ solution is firstly poured into a blunger, and then MgO is added, in which the ratio of $MgCl_2$ solution to MgO is 1 to 2 Kg of MgO in $MgCl_2$ solution per liter; when preparing cement material, wood chips or pearlite powder is firstly poured into a mixer; after the mixer runs 3 to 5 revolutions, MgO is added; and then the mixer starts running and $MgCl_2$ solution is simultaneously added; 1 to 3 minutes later, additional wood chips or pearlite powder is added under agitation such that the ingredients are mixed thoroughly.

5. The process for producing wood-grained glass magnesium siding according to claim 4, wherein, when preparing cement material, when preparing cement material, the ratio between wood chips or pearlite powder added in the first time, MgO, $MgCl_2$ solution, wood chips or pearlite powder added in the second time is as follows: 1 Kg of wood chips or pearlite powder added in the first time, 4 to 9 Kg of MgO, 8 to 18 L of $MgCl_2$ solution, 1 to 3 Kg of wood chips or pearlite powder added in the second time.

6. The process for producing wood-grained glass magnesium siding according to claim 1, wherein, in step (4) of the procedure of manufacturing wood-grained glass magnesium board, the thickness of the first layer of cement paste is from 0.2 to 0.5 mm, and the thickness of the second layer of cement is from 0.1 to 0.3 mm.

7. The process for producing wood-grained glass magnesium siding according to claim 1, wherein, in step (5) of the procedure of manufacturing wood-grained glass magnesium board, a first layer of cement material is overlaid on the second layer of cement paste scraped in step (4), and then a layer of glass fiber fabric is overlaid on the first layer of cement material, and then a second layer of cement material is overlaid on the layer of glass fiber fabric, and then another layer of glass fiber fabric is overlaid on the second layer of cement material, finally, the one or more layers of non-woven fabric are overlaid on the layer of glass fiber fabric.

8. The process for producing wood-grained glass magnesium siding according to claim 7, wherein the thickness of the layer of cement material is from 4 to 20 mm.

9. The process for producing wood-grained glass magnesium siding according to claim 1, wherein, in step (9) of the procedure of manufacturing wood-grained glass magnesium board, when curing the boards, a primary curing is performed in a primary curing area at the environmental temperature of 20° C. to 30° C. for 18 to 24 hours; when the boards have a curing ratio of more than 90%, demoulding is performed; subsequently, a secondary curing is performed in a secondary curing area at the temperature of 10° C. to 35° C. for 10 to 28 days.

10. The process for producing wood-grained glass magnesium siding according to claim 1, wherein, in step (10) of the procedure of manufacturing wood-grained glass magnesium board, the temperature for drying is between 20° C. and 40° C. for 7 to 9 days under ventilation and moisture removing.

* * * * *